(12) United States Patent
Riveiro Rodríguez et al.

(10) Patent No.: US 11,148,945 B2
(45) Date of Patent: Oct. 19, 2021

(54) METHOD ASSISTED BY A LASER AND HIGH-INTENSITY ELECTRIC FIELDS FOR THE SYNTHESIS AND COLLECTION OF NANOPARTICLES AND THE GENERATION OF COATINGS

(71) Applicant: Universidad de Vigo, Vigo (ES)

(72) Inventors: Antonio Riveiro Rodríguez, Vigo (ES); Jesús Del Val García, Vigo (ES); Mohamed Boutinguiza Larosi, Vigo (ES); Fernando Lusquiños Rodríguez, Vigo (ES); Rafael Comesaña Piñeiro, Vigo (ES); Félix Quintero Martínez, Vigo (ES); Juan María Pou Saracho, Vigo (ES)

(73) Assignee: Universidad de Vigo, Vigo (ES)

( * ) Notice: Subject to any disclaimer, the term of this patent is extended or adjusted under 35 U.S.C. 154(b) by 94 days.

(21) Appl. No.: 16/612,901

(22) PCT Filed: May 11, 2018

(86) PCT No.: PCT/ES2018/070349
§ 371 (c)(1),
(2) Date: Nov. 12, 2019

(87) PCT Pub. No.: WO2018/206836
PCT Pub. Date: Nov. 15, 2018

(65) Prior Publication Data
US 2020/0156934 A1    May 21, 2020

(30) Foreign Application Priority Data

May 12, 2017    (ES) ............... ES201730689

(51) Int. Cl.
*B82B 3/00*    (2006.01)
*B05D 1/00*    (2006.01)
*C01B 33/18*    (2006.01)

(52) U.S. Cl.
CPC ............ *B82B 3/0071* (2013.01); *B05D 1/007* (2013.01); *C01B 33/181* (2013.01); *C01P 2004/03* (2013.01); *C01P 2004/64* (2013.01)

(58) Field of Classification Search
CPC ....... B82Y 40/00; C01B 32/15; C01B 32/154; C01B 32/156; C01B 32/16; C01B 32/164;
(Continued)

(56) References Cited

U.S. PATENT DOCUMENTS 5,316,636 A * 5/1994 Bunshah ............... C01B 32/156
204/157.47
6,368,406 B1 * 4/2002 Deevi ...................... B22F 9/12
117/108

OTHER PUBLICATIONS

International Search Report for PCT/ES2018/070349, dated Jul. 24, 2018 in 6 pages.
(Continued)

*Primary Examiner* — Michael P Wieczorek
(74) *Attorney, Agent, or Firm* — Knobbe, Martens, Olson & Bear, LLP

(57) ABSTRACT

The present invention relates to a method for synthesizing and collecting, in a single step, nanoparticles of different materials, and for producing coatings thereof on materials with simple or complex geometries, both in a controlled atmosphere and in ambient conditions, by means of the combined application of a laser beam and high-intensity electric fields.

17 Claims, 2 Drawing Sheets

(58) Field of Classification Search
CPC . C01B 33/181; C01P 2004/64; B82B 3/0071; B05D 1/007
See application file for complete search history.

(56) References Cited

OTHER PUBLICATIONS

Abdelsayed, Victor et al., Differential Mobility analysis of nanoparticles generated by laser vaporization and controlled condensation (LVCC). Journal of Nanoparticle Research, Apr. 26, 2006, vol. 8, No. 3, pp. 361-369, ISSN 88-0764, <DIUL10.1007/s11051-005-9015-z> abstract, paragraph Experimental Procedure.

Makino, T., et al., "Size classification of Si nanoparticles formed by pulsed laser ablation in helium background gas." Applied Physics A: Material Science & Processing, Dec. 22, 1999, vol. 69, No. 7, pp. S243-S247, <DOI: 10.1007/s003399900303> paragraph 3.

Henneke, Dale E. et al., Stabiliation of silver nanoparticles in nonanoic acid: A temperature activated conformation reaction observed with surface enhanced Raman spectroscopy. Journal of Chemical Physics, Sep. 1, 2003, vol. 119, No. 13, pp. 6802-6809, <DOI: 6802-6809> paragraph 2.

\* cited by examiner

METHOD ASSISTED BY A LASER AND HIGH-INTENSITY ELECTRIC FIELDS FOR THE SYNTHESIS AND COLLECTION OF NANOPARTICLES AND THE GENERATION OF COATINGS

CROSS-REFERENCE TO RELATED APPLICATIONS

This application is the U.S. National Phase under 35. U.S.C. § 371 of International Application PCT/ES2018/070349, filed May 11, 2018, which claims priority to Spanish Patent Application No. P201730689, filed May 12, 2017. The disclosures of the above-described applications are hereby incorporated by reference in their entirety.

OBJECT OF THE INVENTION

The present invention relates to a method for synthesizing and collecting, in a single step, nanoparticles of different materials, and optionally for producing coatings thereof on materials with simple or complex geometries, both in a controlled atmosphere and in ambient conditions, by means of the combined application of a laser beam and high-intensity electric fields.

By means of this new technique, nanoparticle size distribution can be adjusted by means of varying parameters relating to the laser, parameters relating to the electric field required in nanoparticle generation, as well as parameters relating to the process atmosphere. In the case of particle collection on a substrate material, or for the purpose of generating a coating thereon, no preparation whatsoever of said substrate material is required. Finally, the precursor material required for the preparation thereof must be in solid or liquid phase, with no restriction whatsoever being imposed on its shape (although materials with a cylindrical geometry have been observed to be preferable).

BACKGROUND OF THE INVENTION

Particles with nanometric sizes (diameters) of about 100 nm or less and commonly designed as nanoparticles have unique physical or chemical properties, where they are generally very different from the properties shown by macroscopic nanoparticles made of the same material. The properties of these materials show a clear influence of both nanoparticle size and shape. As a result of their smaller size, nanoparticles have a high surface-to-volume ratio, which makes the chemical reactivity thereof much higher than their macroscopic counterpart. In the case of nanoparticles made of semiconductor materials (e.g., CdS or CdSe), also referred to as quantum dots, their optical and electronic properties vary greatly with their diameter.

Given that these materials have exceptional properties, they are applicable in a wide variety of fields, such as: electronics, optoelectronics, information storage, energy, biomedicine, chemistry, etc. Nanoparticles made of a wide variety of materials can be synthesized using many different techniques, including physical, chemical, biological, and hybrid techniques. All these techniques and methods have their own advantages and drawbacks. In that sense, nanoparticle synthesis by means of conventional chemical methods is considered a scalable process for producing different kinds of nanoparticles in large amounts; however, the chemicals used are generally toxic. To solve this problem, an alternative consists of synthesis by biological means using microorganisms, biomolecules, or extracts derived from plant sources. However, this approach also has drawbacks, primarily with respect to the polydispersity of the formed nanoparticles being a challenge today, as well as the problems derived from the use of certain bacteria and fungi with a pronounced pathogenic character which may pose a danger from the health perspective. Many of these problems are avoided using methods for synthesis by means of physical techniques; therefore, nanoparticles and coatings thereof are achieved very quickly by means of these methods without contamination problems and with a high degree of distribution uniformity. The main drawback of these methods is that they usually require costly vacuum systems or equipment for plasma generation.

Laser-based methods stand out among physical methods because, in comparison with other methods, they constitute simple and quick methods for the synthesis of nanoparticles, do not require long reaction times, high temperatures, or chemical methods with multiple steps. Furthermore, they allow producing nanoparticles of different materials including metallic nanoparticles, semiconductor nanoparticles, polymer nanoparticles, as well as nanoparticles of semiconductor alloys or multiple metallic elements. The main laser-based techniques are: a) laser pyrolysis, b) laser ablation, or c) pulsed laser deposition. Laser pyrolysis generates nanoparticles as a result of the condensation of the products generated from laser-induced chemical reactions during the interaction of a precursor/reagent flow in gaseous phase and a laser beam operating generally in a continuous mode. The main problem of this technique is that the precursors/reagents must be in gaseous phase exclusively and that one or more of them must have absorption bands suitable for assuring coupling with the laser radiation used. Laser ablation can be performed in a vacuum, controlled atmosphere, or in a liquid, with nanoparticles being generated by means of laser ablation of a solid blank arranged in a gaseous or liquid environment, followed by the collection of the nanoparticles in the form of powder or colloidal solution. The main problems of this technique are that in addition to the nanoparticles, fragments of precursor material having a size which ranges from subnanometric to micrometric (these fragments therefore being an unwanted by-product of the process) can be formed during ablation, along with a reduced production rate. Finally, pulsed laser deposition uses high-energy laser pulses for ablating a material through fusion, vaporization, and ionization, like in laser ablation, but in this case the precursor material is deposited on a substrate. In addition to the drawbacks of laser ablation, this technique involves the use of costly vacuum equipment.

It can therefore be verified that the main drawbacks of laser-based nanoparticle production processes are: their low production rate, the need for costly vacuum equipment and systems, as well as the possibility of the simultaneous generation not only of nanoparticles, but also of fragments with various sizes. New nanoparticle production methods by means of laser which solve some or all of the current limitations of the nanoparticle production techniques by means of laser are therefore required.

DESCRIPTION OF THE INVENTION

The present invention presents a new laser technology-based technique for the synthesis of nanoparticles, for the collection of nanoparticles, and optionally for the controlled deposition of nanoparticle coatings on metallic and non-metallic material substrates, which does not require costly vacuum equipment and systems, only produces nanoparticles, and has higher production rates than laser ablation-based production techniques.

This technique involves the vaporization of one or more precursor materials (which must be in solid or liquid phase) with the desired composition/compositions of the nanoparticles by means of one or more laser beams, with the power and wavelength required for such purpose. A high-intensity electric field (preferably with a maximum intensity in the order of $10^6$-$10^7$ V/m) is simultaneously generated by means of establishing a high potential difference (preferably 5-50 kV) between a metallic conductor (referred to hereinafter as electrode) arranged close (typically with a separation between 1 and 15 mm) to the precursor material vaporizing region, and another metallic conductor (hereinafter, counter electrode) on which the nanoparticles will be collected or on which a substrate material for said collection will be placed or for generating thereon a controlled deposition of nanoparticles. The shapes and sizes of the electrode and counter electrode must preferably be that of a rod or pointed tube and a planar sheet or plate, respectively, although this patent is not limited to same, provided that the chosen combinations provide an electric field large enough to generate an electric wind in the atmosphere in which the nanoparticles are generated. As the precursor material/materials are vaporized by means of the action of the laser beam (or beams), the strong electric field existing at the tip of the electrode will cause the resulting vapors and the process atmosphere to be electrically charged, and they will be entrained along the lines of the electric field to the counter electrode. During movement, said supersaturated vapors will cool down more or less quickly depending on the speed of the existing gaseous stream, where vapors condensing and finally giving rise to nanoparticles by means of nucleation and growth processes. Finally, given that said nanoparticles are electrically charged, they will move to and be deposited on the counter electrode, or another material which is placed in the path towards same. The continuous application of the present process therefore allows generating nanoparticles, collecting same, and if desired, obtaining nanoparticle coatings on metallic and non-metallic substrates which are placed in the path of the nanoparticles towards the counter electrode.

The present invention offers the following advantages, among others:

- the nanoparticle generation rate is greater than that of laser ablation-based processes given that it is based on the vaporization of the precursor material and not on the ablation of a precursor material, a process which generally uses laser beams with laser pulses of a very short duration and ablates the precursor material (i.e., removes the precursor material) in a very superficial manner.
- Given that the precursor material only has to be vaporized, the energy requirements of the process are low (such that laser beams with a low average power can be used, provided that the irradiance thereof is sufficient to vaporize a precursor material).
- A controlled atmosphere is not required, though it can be controlled if necessary.
- The use of vacuum equipment and systems is not required.
- Neither the precursor material nor the substrate requires a strict prior preparation.
- The precursor material can be fed in various solid or liquid forms (thread, rod, film, plate, in powder form, etc.), which does not limit the type of material.
- The system can be readily integrated and automated to obtain nanoparticles and to achieve controlled nanoparticle depositions, because the process can be controlled by means of parameters relating to the laser beam (which determine the rate of vaporized material), parameters relating to the intensity of the electric field (which determine the vapor condensation process, and therefore the size of the generated nanoparticles, as well as their transport), as well as parameters relating to the atmosphere (nature, pressure, or density).
- Given that the formation of the nanoparticles lies in transport by means of ionization of the vapors of the precursor material and of the process atmosphere, the nanoparticles acquire an electric charge.

DESCRIPTION OF THE DRAWINGS

These and other features and advantages of the invention will become apparent based on the following detailed description of a preferred embodiment, given only by way of illustrative and non-limiting example in reference to the attached figures.

DETAILED DESCRIPTION OF A PREFERRED EMBODIMENT OF THE INVENTION

Figure 1:
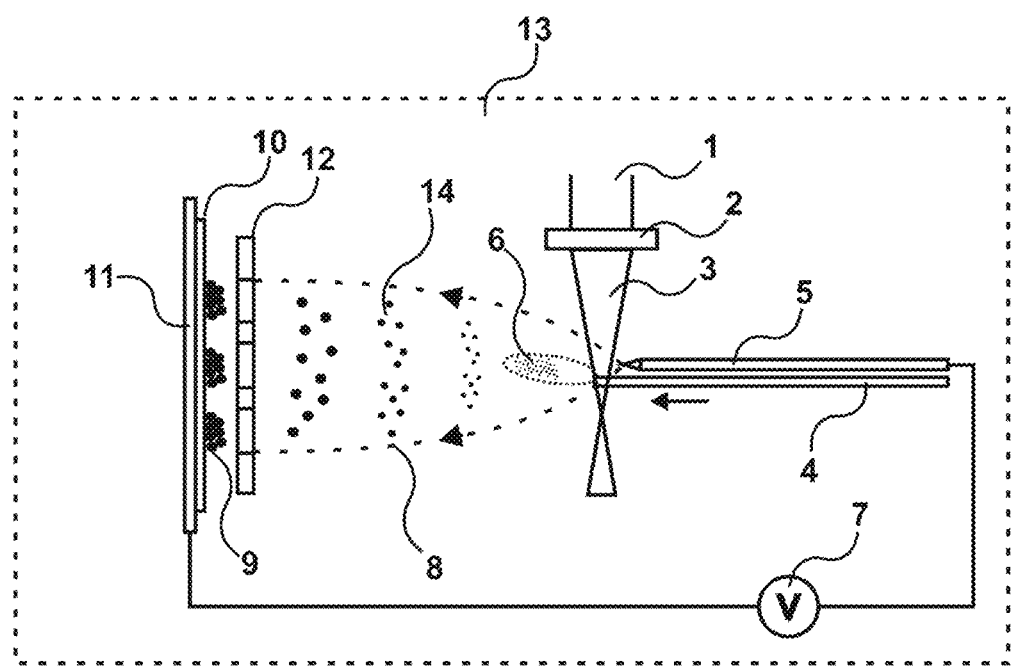
FIG. 1 shows a diagram of the nanoparticle generation, collection, and deposition system according to an embodiment of the invention.

Nanoparticle production, as well as collection, and optionally deposition on a substrate for the purpose creating layers of nanoparticles thereon can be carried out by means of a system such as the one depicted in FIG. 1.

In the method of the invention, a laser beam (1) is led by means of a focus guiding system (2), such as an optical fiber or mirrors, depending on the type of laser source used, to the solid or liquid precursor material (4) to vaporize it. In a particular embodiment, the precursor material (4) is in the form of a sheet, flat, rod, thread, or tape, preferably in the form of a thread, more preferably in the form of a thread with a diameter of less than 2 mm.

If a continuous production of nanoparticles (14) is desired, a system which establishes relative movement between the laser beam (1) and the precursor material (4) must be arranged. This relative movement can be carried out by moving the laser beam (1) with the precursor material (4) remaining in place, or the other way around, by moving the precursor material (4) with the laser beam (1) remaining in place. Examples of a mobile system or systems providing relative movement to the laser beam (1) with respect to the precursor material (4) in step c) include a robot, a coordinate table, or a combination of both systems. In turn, the substrate material (19) for collecting nanoparticles (9) or optionally for being coated with them must be located at a certain distance from the preceding system (which distance must be greater than the distance which causes the dielectric breaking of the process atmosphere (13)) and on a support that may be movable or stationary with respect to the precursor material (4). The mentioned movable systems can consist of a manual or automatic positioning system of any type which is not shown in the figure as it is widely used in industrial equipment.

This technique requires vaporizing the precursor material (4). To that end, the laser beam (1) must be focused by means of a focusing system (2) to achieve the irradiance required for vaporizing the precursor material (4). This focusing system (2) can consist of both a pair of mirrors, one of them being a planar mirror and the other parabolic, for example, and a simple lens, a double-focus lens, or combinations thereof. The focusing system (2) must be selected as the most suitable one depending on the type and power of the laser to be used.

To carry out the nanoparticle generation process, in addition to the action of a laser beam (1) for vaporizing the precursor material (4), there is a need for a high-intensity electric field (preferably with a maximum intensity in the order of $10^6$-$10^7$ V/m), which will generate a transport flow (8) of the vaporized material (6) as a result of the ionization of the vapors of the precursor material as well as of the atmosphere (13) in which the process is carried out. To generate said electric field, a high potential difference comprised between 5 and 50 kV, for example, will be generated by means of a high-voltage, low-current source (preferably, sources producing direct current and a positive or negative output polarity) (7) between two conductive electrodes, referred to as electrode (5) and counter electrode (11). In a preferred embodiment, a potential difference of between 20 and 30 kV is established.

The shape of these electrodes will be determined mainly by the need to establish a high-intensity electric field (in atmospheric conditions, up to a mean intensity of 1-30 kV/cm). The electrode (5) will usually be a rod or tube which has a small diameter and is made of a conductive material (preferably a material with a high electric conductivity such as copper or aluminum), with one of its ends being extremely pointed in both cases. The counter electrode (11) can be a planar conductive plate (preferably a material with a high electric conductivity such as copper or aluminum), or with the most appropriate shape according to the geometric shape of the substrate (10) used to collect or to be coated with nanoparticles (9). In a preferred embodiment, the geometric shape of the electrode (5) is tubular with one of the ends thereof being pointed and the counter electrode (11) is planar.

As a result of the strong electric field established between the electrode (5) and the counter electrode (11), some vapor molecules originating from the vaporized precursor material, as well as the atmosphere in which the process takes place, are ionized and accelerated towards the counter electrode along the lines of the electric field. The collision of these ionized molecules with other non-ionized molecules gives rise to a stream of vaporized material (6) from the precursor material (4) to the counter electrode (11). To achieve an effective flow of vapor (6), the pointed end of the electrode (5) must be located close (typically with a separation of between 1 and 15 mm) to the precursor material (4), preferably concentric thereto (although this invention is not limited to this geometry alone). In a particular embodiment, the electrode (5) is tubular and the precursor material is in the form of a thread, both being located concentric to one another at a distance of between 1 and 15 mm, preferably between 5 and 10 mm. In this case, a precursor material (4) in the form of a rod and an electrode (5) in the form of a tube must be used, with the end of the electrode (5) having the precursor material (4) projecting from same being as pointed as possible to thereby achieve a large enough electric field in the surroundings thereof.

During the movement of the vapor originating from the precursor material (4) irradiated with the focused laser beam (3) from the proximities of the electrode (5) towards the counter electrode (11), nanoparticles (14) are formed as a result of homogenous nucleation phenomena in the gaseous phase, as well as of subsequent condensation and coagulation. Said nanoparticles can finally be collected after being deposited on the same counter electrode (11) or on a substrate material (10) which is placed in their path towards the counter electrode (11). The substrate material (10) which is used for collecting the nanoparticles (14) or which is to be coated can have a geometric shape similar to the geometric shape of the counter electrode (11) used. In a particular embodiment, the substrate material (10) used for collecting the nanoparticles (14) or on which the nanoparticle coating (9) is to be produced is metallic or non-metallic. In another particular embodiment, the nanoparticles (14) are deposited on a surface of the substrate material (10) of 50 mm×50 mm to 100 mm×100 mm, for separations between the electrode (5) and counter electrode (11) of 5-30 cm, such as 15-30 cm or 5-20 cm, for example, more preferably 5-10 cm. In another particular embodiment, the particles are collected in a counter electrode in the form of a tip.

Likewise, controlled depositions of nanoparticles, i.e., coatings (9), on the substrate material (10) (or even on the counter electrode (11), if this were the case), and with the desired geometric shape, can be achieved by placing a mask (12) in the path of the nanoparticles. Said mask (12) must be located close (typically at a distance of less than 1 mm) to the surface to be coated, if a geometric shape with a clear contour is to be obtained.

The final size of the nanoparticles depends primarily on the vaporization rate of the precursor material (4), as well as the rate at which the vapors (6) originating from the precursor material (4) irradiated by the focused laser beam (3) cool down and condense. Therefore, the final size distribution of the nanoparticles can be controlled by means of the parameters which control the vaporization rate (fundamentally: the power of the laser beam, the focusing of the laser beam, the relative speed between the laser beam or precursor material, although it is not solely limited to these parameters; other parameters such as the work mode of the continuous/pulsed laser beam, pulse length, work cycle, etc. can also be modified), as well as those parameters which control the vapor cooling/condensation rate and are fundamentally related with the intensity of the vapor stream between the electrode and counter electrode (fundamentally: distance, voltage, and geometric shape of the electrode-counter electrode (5)-(11), nature, density, and pressure of the atmosphere (13) in which the process takes place, among others).

This process can be carried out in atmospheres (13) containing gases of a different nature. For example, the atmosphere (13) in which the process is carried out can be made up of Ar, He, Ne, $N_2$, $CO_2$, air, $O_2$ or derived mixtures. Depending on the type of gas used, its density or pressure, the vaporized material entraining speed as a result of the electric field can differ significantly. To control the atmosphere used, the process region will be enclosed within a space which prevents contamination by contact with the outside. The mentioned control systems are not shown in FIG. 1 as they are widely used in industrial equipment.

The most suitable atmosphere (13) will be selected depending on the type of nanoparticles to be obtained; for example, if the formation of oxide nanoparticles is sought (such as for example $SiO_2$, ZnO, $ZrO_2$, $TiO_2$, or $Al_2O_3$, among others) oxygen-rich atmospheres will preferably be used, whereas if the formation of nanoparticles of pure elements is sought (such as for example, Au, Ag, Pt, or Fe, among others), inert atmospheres with vapors of said elements will be used.

This method for producing nanoparticles (9) is not limited to the use of a single precursor material. It is possible to vaporize a single (metallic or non-metallic) precursor material (4) with the desired composition of the nanoparticles to be obtained, and several precursor materials (4) simultaneously, using to that end one or more laser beams. The only limitation that is imposed is that the region vaporized by the focused laser beam (3) must be close the pointed region of the electrode (5), typically at a separation of between 1 and 15 mm. When the different precursor materials are vaporized, their vapors will mix together during entrainment and nanoparticles with a mixed composition of these vapors will be formed.

The laser source generating the laser beam required for vaporizing the precursor material (4) can originate from laser equipment emitting a laser of any wavelength such as, for example, $CO_2$, CO, $N_2$, Nd:YAG, Nd:YVO$_4$, Er:YAG, Nd:glass, Yb:YAG laser; Ruby, HeNe, HeCd, HeHg, Cu, I, Ar, Kr, diode, fiber, disk, chemical, excimer, alexandrite, emerald, or dye laser. However, said laser source must emit a laser beam with a suitable wavelength so that the energy of this laser beam (1) is efficiently absorbed by the precursor material (4) and successfully vaporizes same. Due to their optical properties, most insulating precursor materials fundamentally absorb laser radiation in the UV and far-infrared region of the electromagnetic spectrum, whereas metallic precursor materials absorb UV laser radiation better. The power required for lasers of this type must be sufficient so that the laser beam (1) it emits, once being concentrated by means of the focusing system, is capable of vaporizing the precursor material. Therefore, the required power will be determined by the thermophysical properties of the material: specific heats and latent heats of fusion and evaporation. In a particular embodiment, the power supplied by the laser beam is comprised between 100 and 2000 W, such as between 700 and 1200 W, for example.

EXAMPLES

The method of the present invention has been used for producing $SiO_2$ nanoparticles as well as for creating coatings thereof in a controlled manner on 100 μm thick polyester substrates without these substrates undergoing any chemical or shape alteration.

The precursor material used was pure silica in the form of a thread, with a diameter of 0.6 mm, and commonly used in optical fibers. The laser source used for vaporizing same was a $CO_2$ laser (because the radiation it emits is absorbed to a great extent by the silica), working in a continuous mode and supplying between 200 and 300 W of average laser beam power. The laser beam was focused between 10 and 20 mm below the surface of the precursor material by means of a ZnSe lens with a focal length of 190 mm.

To generate the vapor stream towards the counter electrode, a steel needle with an external diameter of 1.6 mm and with one of its ends being pointed was used as the electrode. A rectangular copper plate with dimensions of 205 mm×120 mm was used as the counter electrode. The precursor material was fed concentrically to said (internally hollow) needle. Potential differences between 20 and 30 kV were established between the electrode and counter electrode. The distance between the electrode and counter electrode was adjusted to 15-30 cm and both the electrode and counter electrode were positioned approximately perpendicular to one another (as schematically shown in FIG. 1). The establishment of said conditions between the electrode and counter electrode gives rise to the material vaporized by the laser beam being transported towards the counter electrode as a result of the ionization of the vapors and process atmosphere and of the interaction thereof with the existing electric field.

In this case, the nanoparticle generation process was carried out in standard atmospheric conditions (i.e., atmospheric pressure, temperature of 20° C., and relative humidity of 30-60%), given that the nanoparticles to be obtained were $SiO_2$.

Figure 2:
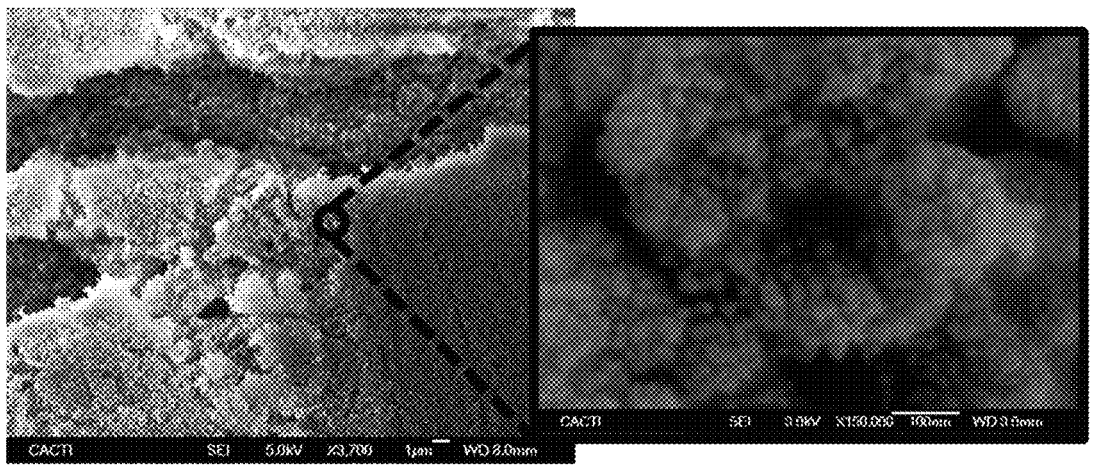
FIG. 2 shows the images obtained by means of field emission scanning electron microscopy (FESEM) of a $SiO_2$ particle deposit produced according to the method of the invention.

Using the preceding process conditions, $SiO_2$ nanoparticles as collected in FIG. 2 were obtained, with an atomic percentage of Si of 34.71% and of O of 65.29% being determined by means of energy-dispersive X-ray spectrometry (EDS) and with no other elements being detected. This corresponds with a Si/O ratio of 0.53, therefore confirming that the nanoparticles are made up of $SiO_2$.

Figure 3:
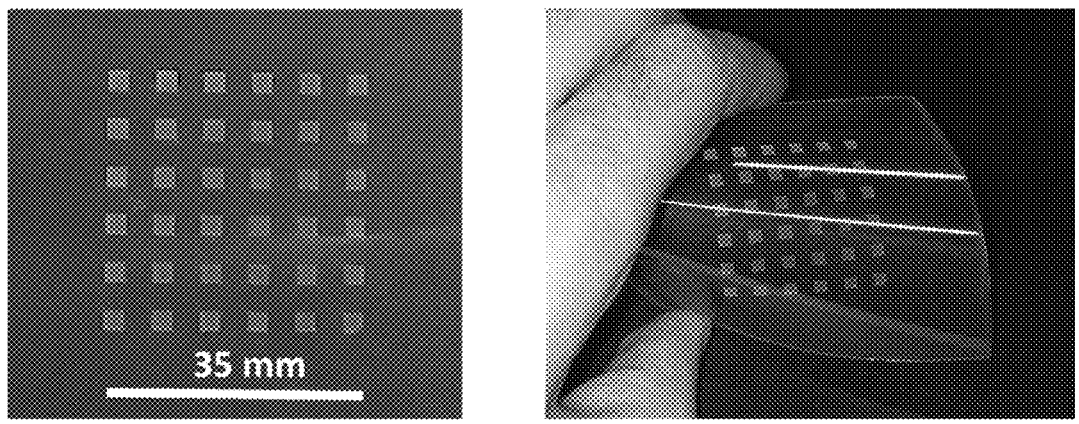
FIG. 3 shows the optical images of $SiO_2$ coatings produced according to the method of the invention, with a square geometric shape (2.5 mm×2.5 mm), simultaneously deposited in an area of 35 mm×35 mm on a transparent polyester film, and generated by placing a mask with the same geometric shape immediately before the polyester film.

Using identical conditions, silica nanoparticles were deposited in a controlled manner on transparent polyester films. FIG. 3 shows an example of said deposits. Deposition occurred in an area of 35 mm×35 mm with deposits having a square geometric shape of 2.5 mm×2.5 mm, by placing a mask with the same geometric shape immediately before the transparent polyester film.

Having sufficiently described the nature of the present invention, as well as the manner of putting it into practice, all that remains to be said is that changes relating to shape, materials, and arrangement can be introduced in the invention, as a whole and in parts making up same, provided that said alterations do not substantially change said invention.

What is claimed is:

1. A method for the synthesis of nanoparticles, and for the collection or controlled deposition thereof on surfaces, wherein said method comprises:
   a) positioning a solid or liquid precursor material, optionally said positioning taking place in a system connected to equipment for controlling the position of said solid or liquid precursor material which allows relative movement with respect to a laser beam,
   b) focusing the laser beam by means of a focusing system suitable for generating a focused laser beam on the precursor material,
   c) vaporizing the surface of precursor material irradiated by the focused laser beam, said focused laser beam being stationary or provided with relative movement with respect to the precursor material,
   d) establishing a potential difference in a range between 5 and 50 kV between an electrode and a counter electrode, the electrode being located at a separation distance of between 1 and 15 mm from the region of the vaporized material,
   e) entraining the vaporized material by means of an ionization of the vaporized material and of the atmosphere in which the method is carried out, thereby transporting the vaporized material from the electrode to the counter electrode,
   f) nucleating and condensing the vaporized material during the transport thereof from the electrode to the counter electrode, giving rise to the formation of nanoparticles, g) optionally, placing a mask in the flow path of the nanoparticles if a nanoparticle coating with a specific geometric shape is to be produced on the counter electrode or on a substrate material which is placed in the flow path of the nanoparticles towards the counter electrode, and h) collecting or depositing the nanoparticles to produce a coating on the surface of the counter electrode or of the substrate material.

2. The method according to claim 1, wherein the deposition of the nanoparticles in step h) is performed on a surface of the substrate material of 50 mm×50 mm to 100 mm×100 mm, and wherein the separations between the electrode and counter electrode in step d) is of 5-30 cm.

3. The method according to claim 1, wherein one precursor material with the desired final composition of the nanoparticles or several precursor materials which, as a whole, have the desired final composition of the nanoparticles are used.

4. The method according to claim 1, wherein the precursor material is in the form of a sheet, flat, rod, thread, or tape.

5. The method according to claim 4, wherein the precursor material is in the form of a thread.

6. The method according to claim 1, wherein the power supplied by the laser beam is between 100 and 2000 W.

7. The method according to claim 1, wherein the laser beam focusing system consists of a pair of mirrors, one of them being a planar mirror and the other parabolic.

8. The method according to claim 1, wherein the laser beam focusing system consists of a simple lens, a double-focus lens, or an array of lenses.

9. The method according to claim 1, said method being carried out in an atmosphere made up of Ar, He, Ne, N2, $CO_2$, air, $O_2$, or derived mixtures.

10. The method according to claim 1, wherein the relative movement of the laser beam with respect to the precursor material in step c) is provided by a robot, a coordinate table, or a combination of both systems.

11. The method according to claim 1, wherein the laser beam originates from a $CO_2$, CO, $N_2$, Nd:YAG, Nd:YVO4, Er:YAG, Nd:Glass, Yb:YAG laser; Ruby, HeNe, HeCd, HeHg, Cu, I, Ar, Kr, diode, fiber, disk, chemical, excimer, alexandrite, emerald, or dye laser.

12. The method according to claim 1, wherein the vaporized material and the atmosphere of the method are ionized by means of establishing a potential difference between 20 and 30 kV between the electrode and the counter electrode.

13. The method according to claim 1, wherein the geometric shape of the electrode is tubular, with one of the ends thereof being pointed, and the counter electrode is planar.

14. The method according to claim 1, wherein the electrode is tubular and the precursor material is in the form of a thread, both being located concentric to one another at a distance of between 1 and 15 mm.

15. The method according to claim 1, wherein the substrate material used to collect the nanoparticles or to be coated has a geometric shape as the geometric shape of the counter electrode used.

16. The method according to claim 1, wherein the substrate material used for collecting the nanoparticles or on which the nanoparticle coating is to be produced is metallic or non-metallic.

17. The method according to claim 1, wherein the generated nanoparticles acquire an electric charge.

* * * * *